United States Patent Office 3,705,855
Patented Dec. 12, 1972

3,705,855
REVERSIBLE-EMULSION AEROSOL SYSTEM
Frank William Marschner, Whitehouse Station, N.J., assignor to Colgate-Palmolive Company, New York, N.Y.
No Drawing. Continuation-in-part of abandoned application Ser. No. 472,014, July 14, 1965. This application July 24, 1970, Ser. No. 58,197
Int. Cl. C11d 17/04
U.S. Cl. 252—90            7 Claims

ABSTRACT OF THE DISCLOSURE

A pressurized water-in-oil emulsion which reverses to a stable oil-in-water emulsion and can foam a finite time after discharge from aerosol container, comprising two immiscible liquids in emulsified form, said emulsion having water in the dispersed phase, and propellant being the continuous phase.

---

This application is a continuation-in-part of copending application Ser. No. 472,014, filed July 14, 1965 now abandoned.

The present invention relates to water-in-oil emulsions and, more particularly, to water-in-oil emulsions which are self-propelling and in which normally gaseous, liquefied propellant is the continuous phase.

In accordance with the present invention it has now been found that, whereas the so-called water-in-oil reversible type emulsions prepared by dispersing oil-in-water emulsion in a continuous oil phase are difficult to control as water-in-oil emulsions after discharge into the ambient atmosphere, true controlled water-in-oil reversible emulsions can be prepared by combining water with liquefied propellants containing dissolved oil- and water-soluble compounds and a water-in-oil emulsifier.

Accordingly, it is an object of the present invention to prepare reversible water-in-oil aerosol emulsions. It is another object of the present invention to prepare reversible water-in-oil aerosol emulsions containing water-soluble surfactants which can be classified as detergents, oil-in-water emulsifiers, wetting agents or foaming agents. It is a further object of the present invention to control the distance from the dispenser which is required for the water-in-oil emulsion to reverse to an oil-in-water emulsion. It is a major object of the present invention to prepare a reversible water-in-oil emulsion which, when discharged on a surface, gradually reverses upon standing or with agitation. The present invention also has as an object the preparation of relatively stable water-in-oil emulsions which can be reversed by the addition of water, alcohol or mineral spirits containing surfactants. These and other objects of the present invention will become apparent to those skilled in the art from the following description thereof.

The invention makes a significant contribution by solving a long existing problem in the art; the existence of this problem is evidenced by the literature as described below. It was not found in the patent or chemical literature how to form a water-in-oil emulsion aerosol system that can foam either immediately upon discharge from an aerosol container or a predetermined time thereafter. The text of Herzka and Pickthall, entitled "Pressurized Packaging (Aerosols)," Academic Press Inc., second edition 1961, discusses foam emulsions on page 208 setting out the problem in the art which the applicant has solved. The pertinent section of that page is reproduced below.

"The first emulsified product dispensed by the pressurized technique was shaving cream and this lent itself ideally to pressure dispensation. Here we are dealing with a modified aqueous soap solution which is capable of emulsifying the liquid propellant in the dispenser. On forcing the emulsion from the valve, the rapidly expanding propellant is trapped in the soap solution in the form of thousands of tiny bubbles. To a large extent shampoos are dispensed in the same way and in both cases the consumer receives the dose just as he or she wants it. This technique of dispensing an O/W emulsion as a foam can be as is, extended to products such as hand creams and perfumed foams. While the former come closer to the more conventional type of emulsified product, they are still in an aerated condition. Nevertheless, attractive O/W emulsions can be made even when soaps are used as the emulsifying agent. These creams differ from the shaving creams in as much as they may contain greater amounts of oily ore fatty substances and as aeration is not required, other emulsifiers such as the nonionics can be employed. The real problem arises when attempting to produce creams of the opposite type, namely, water-in-oil. Here we are faced with the fact that the propellant becomes part of the continuous phase from which it readily escapes without forming the close bubble structure found in the O/W type. The net result is that when the W/O emulsion leaves the valve, it spreads and bubbles, to leave an unsightly oily mess. A solution to this problem is being sought in many laboratories."

The difference between oil-in-water and water-in-oil emulsions is stated on page 36 of Shepherd, H. R., Aerosols: Science and Technology, Interscience 1961. The author relates that both water-in-oil and oil-in-water emulsions can be prepared with liquefied gaseous propellant as the oil phase. The principal difference between the two types of aerosol emulsions is that the oil-in-water type gives a foamy discharge while the water-in-oil type produces true sprays similar to those from formulations containing a single-liquid phase. It is also stated on the same page that commercial aerosol foam products, such as shaving cream, shampoo, and similar formulations are oil-in-water emulsions. The propellant is dispersed in the aqueous soap or detergent solution. Usually, the soap or solution used in the formation also serves as the emulsifying agent although various other materials may be added to improve the formula. It is specifically stated on this page that when the propellant is the continuous phase foams are not produced (lines 34 and 35).

In the U.S. Pat. 2,524,590 issued to Boe, there is suggested emulsions which lend themselves to phase reversal. However, Boe does not teach, suggest or even hint at how to prepare water-in-oil emulsions which reverse to stable oil-in-water emulsions which can foam. Boe states that emulsions which are subject to phase reversal are those perfumes and insecticides and is most likely talking about the true spray water-in-oil emulsion, and as stated, makes no mention of their ability to foam and most likely Boe is not addressing himself to the problem which existed in the art. However, if he is, his disclosure obviously did not solve the problem since the Boe patent was issued in 1950 and as indicated in the Herzka and Pickthall text, which is a 1961 publication, solutions to the problem of preparing water-in-oil emulsions which foam are still being sought in many laboratories.

It has been found that water-in-oil emulsions can be prepared by combining water with normally gaseous liquefied propellant containing at least one emulsifier of the water-in-oil type which is soluble in normally gaseous liquefied propellant, and at least one water-soluble surfactant.

Suitable water-in-oil emulsifiers are sorbitan fatty acid esters e.g., sorbitan monopalmitate, sorbitan monolaurate, sorbitan monostearate, sorbitan monooleate, sorbitan tristearate, sorbitan trioleate, sesquioleate; polyglycerol esters of fatty acids e.g., polyglycerol monooleate, polyglycerol monostearate, etc.; glycerol monostearate, propylene glycol fatty acid esters e.g., propylene glycol monostearate, monolaurate; diethylene glycol fatty acid esters e.g., diethylene glycol monooleate monostearate, monolaurate. The preferred water-in-oil emulsifiers are the fatty acid esters of anhydrosorbitol, polyglycerides of fatty acids, and mono-, di- and triethanolamine stearates.

Suitable water-soluble surfactants are alkanolamides; fatty alkanolamides; alkyl sulfonates; sulfated and sulfonated amines and amides; betaine derivatives; diphenyl sulfonate derivatives; ethoxylated alcohols; ethoxylated alkyl phenols; ethoxylated amines and amides; ethoxylated fatty acids; ethoxylated fatty esters; glycerol esters; glycerol esters of fatty acids; lanolin based derivatives; lecithin derivatives; lignin derivatives; acetylated, ethoxylated, or sulfated glycerol esters; sarcosine derivatives; sorbitan derivatives; succinates, sulfo derivatives; alcohol sulfates; ethoxylated alcohol sulfate of ethoxylated alcohol; sulfonates of naphthalene and alkyl naphthalenes; fatty ethers; sulfated ethoxylated alkyl phenols; sulfated fatty esters; benzene, toluene, xylene sulfonates; condensed naphthalene sulfonates; dodecyl and tridecyl benzene sulfonates; petroleum sulfonates; thio and mercapto derivatives; and taurate derivatives. The above water-soluble surfactants may be classified as detergents, wetting agents, lathering or foaming agents and oil-in-water emulsifiers. However, these classifications significantly overlap and for a more specific designation as to which chemicals may fall in the various classifications, reference is made to McCutcheon's "Detergents and Emulsifiers."

The more preferred water-soluble surfactants which fall in the general classifications of detergents, wetting agents, and lathering or foaming agents are as follows: lauric and myristic diethanolamides; cetyl pyridinium chloride; mono-, di-, and triethanolamines; sodium heptadecyl sulfate; sodium dioleyl sulfosuccinate; tallow fatty alcohol; alkaline salts of fatty acids; cocomonoethanolamide.

The more preferred oil-in-water emulsifiers are the ethoxylated fatty acid esters of anhydrosorbitol e.g., polyoxyethylene sorbitan monolaurate; polyoxyethylene sorbitan monopalmitate; polyoxyethylene sorbitan monostearate; polyoxyethylene sorbitan tristearate; polyoxyethylene sorbitan monooleate; polyoxyethylene sorbitan trioleate (10–30 mols ethylene oxide mol sorbitan).

It is to be observed that, when such water-soluble materials are first dissolved in the water and the aqueous solution of the water-soluble compound mixed with the normally gaseous, liquefied propellant, the undesirable oil-in-water type of emulsion is formed. It has been discovered that to form the desirable water-in-oil type of emulsion these water-soluble materials must be added to the normally gaseous, liquefied propellant or oil phase and then the water and oil phase mixed.

To make the present invention, it is essential that the water-soluble surfactant constituents be dissolved or dispersed within the propellant or continuous phase. This is not taught in the art because it is the opposite way of preparing a water-in-oil emulsion. One should take water-soluble or hydrophilic ingredients and place them in the oil or propellant phase. Of course, it is essential that there be an emulsifier present which is of the water-in-oil type in order to obtain a water-in-oil type emulsion. Also important is that the essential ingredients be present in the amounts specified below which are based upon percent by weight of final composition. There should be between 0.1 and 20% of water-soluble surfactant constituent present in the continuous phase or oil phase. The more preferred range for all-purpose cleaners is 0.4–5% and shaving creams is 5% to 15%. There should be a minor but effective amount of emulsifier of the water-in-oil type to facilitate the uptake of water to produce a water-in-oil emulsion. The preferred amount of water-in-oil emulsifier ranges from about 0.5 to about 3.0%. The oil emulsifier is also dissolved in the continuous or prepellant phase. The water in the composition should be present in at least 35% by weight and no more than 80% by weight and more preferably 50% to 75%. The propellants should be present in at least 10% and no more than 50% and preferably 15% to 35% by weight of composition.

Described below is the method of blending the propellants so that the water-in-oil emulsion reverses either immediately upon discharge or a predetermined time thereafter. The time of reversal depends upon the type of compositions being formed. If one desires to form a shaving cream, a propellant blend composed of propellants having boiling points less than 70° F. is formulated and this would result in an emulsion which reverses immediately upon discharge from the container. However, if one desires to prepare a cleaner to remove oily stains and the like, it is desirable to have reversal delayed so that the solvent action of the oil phase can be used to remove oily deposits and stains. As the cleaner is worked, the propellant evaporates and the emulsion reverses to an oil-in-water type which can foam having the oil dispersed therein and is readily removed by means of wiping or rinsing the surface. Depending upon selection of water-soluble surfactants, a stable oil-in-water emulsion which does not foam can also be obtained. This is accomplished by not using water-soluble surfactants which are foaming agents.

Inorganic salts, inorganic builder salts, and alkalies have been dissolved in water and combined with the normally gaseous liquefied propellant containing water-soluble compound of at least one of the aforementioned classes, detergent, oil-in-water emulsifier, wetting agent, foaming agent and a reversible water-in-oil aerosol emulsion obtained.

Suitable salts are magnesium chloride, sodium chloride, potassium chloride, calcium chloride, and similar salts, Suitable alkalies are ammonium hydroxide, magnesium hydroxide, sodium hydroxide, potassium hydroxide, lithium hydroxide and similar compounds. Suitable inorganic builder salts are potassium tetrapyrophosphate, sodium polymaleate, sodium polyitaconate, sodium tripolyphosphate, trisodium nitrilotriacetic acid.

These ingredients do not aid in the formulation of a more stable water-in-oil emulsion. They are added to increase the cleaning ability of these compositions. There is no limitations or criticalities imposed upon these since they are not within the broader aspects of the invention. Also anyone skilled in the art would know which ones would be necessary depending upon the particular formulation one desires to make. Alcoholic solutions of the aforementioned water-soluble surfactants, detergents, oil-in-water emulsifier, wetting agent, foaming agent, hereinafter designated "water-soluble modifier" have been dissolved in the normally gaseous, liquefied propellant, the so-modified propellant combined with water and a stable reversible water-in-oil emulsion obtained.

Other solvents such as butyl Cellosolve, acetone, diethyl carbitol, methyl carbitol, methyl Cellosolve, tetrahydrofuran, methyl ethyl ketone may also be used for increasing the solvent activity of the emulsions with particular regard to spot removal.

When necessary to preserve the water-in-oil emulsion by preventing propellant-dissolved water-soluble compounds from entering the water phase and thus forming oil-in-water emulsions, silicones such as methyl polysiloxane (available as Dow Corning 200 Fluid, 500 cks. viscosity) were found to be effective emulsion stabilizers.

As is recognized these water-in-oil aerosol emulsions in which the propellant is the continuous phase reverse after discharge into the ambient atmosphere forming oil-in-water emulsions. The emulsion reversal is brought about by the evaporation of the normally gaseous, liquefied propellant and emulsification of its dissolved constituents in the water phase. The time required for reversal or the distance from the dispenser to the point at which the reversal takes place is controlled by adjusting the rate of evaporation of the propellant. That is, the composition of the propellant is determined by the boiling points of the individual propellants from which the blend of propellants is made.

Propellants which are suitable for use in the emulsions when used in the previously specified amounts are hydrocarbons having 2–4 carbon atoms in the chain such as ethane, propane, butane and isobutane, halogenated hydrocarbons in particular fluoro-carbons containing 1–4 carbon atoms and fluorine; chlorine, bromine and hydrogen atoms may also be present in the fluorocarbon compounds. Examples of suitable fluoro-carbons are trichloromonofluoromethane, dichlorodifluoromethane, monochlorotrifluoromethane, monobromotrifluoromethane, tetrafluoromethane, dichloromonofluoromethane, monochlorodifluoromethane, trifluoromethane, tetrachlorodifluoroethane, trichlorotrifluoroethane, dichlorotetrafluorotetrafluoroethane, dibromotetrafluoroethane, difluoroethane, and octafluorocyclobutane, and mixtures of said hydrocarbons and said halogenated hydrocarbons. When blends or mixtures of hydrocarbons and halogenated hydrocarbons are used, the preferred proportions of hydrocarbons to halogenated hydrocarbons are 1:4 to 4:1.

It is preferred to use a propellant blend composed mainly of low-boiling components i.e., having boiling points below 70° F., for products requiring foam immediately upon discharge from the dispenser or actuator, e.g., shaving creams. When reversal of the emulsion from the water-in-oil type to the oil-in-water type takes place at a point or on a surface relatively distant from the dispenser, e.g., surface cleaner or table waxer, the time of reversal can be lengthened or the reversal can be delayed by the addition of high boiling propellants, i.e., liquefied propellants having boiling points above 70° F. The preferred range of proportions when blending liquid propellants of low boiling points with liquid propellants of high boiling points is 1:4 to 4:1. It has also been found especially advantageous to discharge a water-in-oil emulsion on a surface which emulsion gradually reverses upon standing or with agitation to an oil-in-water emulsion. When the emulsion exists for a finite period as a water-in-oil emulsion, removal of soil by the continuous oil phase of the water-in-oil emulsion is easier and more effective. After reversal to an oil-in-water emulsion the surface can be wiped clean and dry. Reasonably stable water-in-oil emulsions in which the propellant includes at least one high boiling (>70° F.) propellant can be reversed to oil-in-water emulsions by the addition of water, alcohol, or mineral spirits containing surfactant. Such emulsions are useful for treating or cleaning large areas. The water-in-oil emulsion remains stable and wet until reversed and wiped dry.

The following examples are illustrative of the manner and process of making and using the subject invention; however, the invention is not limited to the products prepared or the materials used.

Illustrative of water-in-oil emulsions which reverse to oil-in-water emulsions almost immediately upon discharge into the ambient atmosphere are the formulations given hereinafter for use as shaving creams. It will be observed that the propellant in Examples 1 and 2 is a mixture or blend of normal butane (n-butane) and a polyhalogenated aliphatic hydrocarbon having not more than two carbon atoms. The "Freon" employed in the formulations is "Freon-12," i.e., dichlorodifluoromethane ($Cl_2F_2C$) having a boiling point of −21.6° F.

EXAMPLE 1 (SHAVING CREAM NO. 1)

Shaving cream concentrate No. 1

| Constituent: | Weight percent |
|---|---|
| Monoethanolamine stearate | 48.28 |
| Stearic-palmitic acids—50:50 | 17.24 |
| Coconut fatty acids | 6.90 |
| Lauric-myristic diethanolamide (70:30=lauric; myristic by weight) | 6.90 |
| Monoethanolamides of coconut oil fatty acids | 6.90 |
| Mixed fatty alcohols prepared by reduction of tallow fatty acids | 6.90 |
| Coconut oil | 3.44 |
| Perfume | 3.44 |
| | 100.00 |

Rapid reverse water-in-oil shaving cream emulsion

| Ingredients: | Weight percent |
|---|---|
| Shaving cream concentrate #1 | 14.50 |
| Sorbitan trioleate ethoxylated [1] with 20 mols of ethylene oxide per mol of sorbitan | 0.50 |
| n-Butane (liquefied) | 9.20 |
| Dichlorodifluoromethane [2] | 5.80 |
| Deionized water | 70.00 |
| | 100.00 |

[1] Available as "Tween 85" from Atlas Chemical Company.
[2] Available as "Freon-12" B.P. −21.6 from Du Pont Company, Wilmington, Del.

EXAMPLE 2 (SHAVING CREAM NO. 2)

Shaving cream concentrate No. 2

| Constituent: | Weight percent |
|---|---|
| Triethanolamine stearate | 48.01 |
| Stearic-palmitic acids—50:50 | 17.15 |
| Coconut fatty acids | 6.86 |
| Monoethanolamides of coconut oil fatty acids | 13.72 |
| Mixed fatty alcohols prepared by reduction of tallow fatty acids (tallow alcohols) | 10.29 |
| Perfume | 3.97 |
| | 100.00 |

Rapid reverse water-in-oil shaving cream emulsion

| Ingredients: | Weight percent |
|---|---|
| Shaving cream concentrate #2 | 13.58 |
| Sorbitan trioleate (ethoxylated with 20 mols of ethylene oxide per mol of sorbitan) [1] | 0.60 |
| n-Butane (liquefied) | 9.20 |
| Dichlorodifluoromethane [2] | 5.80 |
| Deionized water—0.05 molar solution of magnesium chloride | 30.00 |
| Aqueous solution—0.072 N KOH and 0.066 N NaOH | 40.82 |
| | 100.00 |

[1] Available as "Tween 85" from Atlas Chemical Company.
[2] Available as "Freon-12" from Du Pont Company, Wilmington, Del.

The rapidly reversing water-in-oil shaving cream emulsions are prepared in the presently preferred manner. The ingredients of the concentrate are mixed and melted. The concentrate and emulsifier, e.g., polyoxyethylenesorbitan trioleate, are placed in an empty hermetically sealed container, generally known as an aerosol container, and sealed with a valve assembly, e.g., one having an 0.018 inch stem, an 0.080 body, and an 0.12 inch diptube. The propellant blend is then injected through the valve assembly into the container. After introducing the propellant blend into the container the contents are shaken to dissolve all of the ingredients. Warming the container in any suitable manner at a temperature in the range of about 90° to 100° F., e.g., about 95° to 96° F., accelerates the solution of the ingredients of the concentrate. Water or aqueous solutions (vide Example No. 2) are then injected into the container under pressure at least equal to that of the propellant and the contents of the container shaken to form a viscous water-in-oil emulsion.

Alternatively, the concentrates, the emulsifier, e.g., polyoxyethylenesorbitan trioleate, and the propellant blend are mixed in a pressure vessel to form a solution of the concentrate in the propellant. The propellant solution is injected into a sealed aerosol container, water added under pressure, and the contents of the container agitated in any suitable manner.

Both of the water-in-oil shaving cream emulsions prepared as described hereinbefore are stable on storage and reversed to oil-in-water emulsions immediately upon discharge into the ambient atmosphere producing satisfactory shaving cream lathers.

As has been emphasized hereinbefore, the rate of reversal of the water-in-oil emulsion to an oil-in-water emulsion can be controlled by regulating the boiling point of the propellant blend. For an all-purpose cleaner this is an important and valuable characteristic of these novel water-in-oil emulsions. To illustrate the breadth of the time interval before the water-in-oil emulsion reverses to an oil-in-water emulsion, the following illustrative examples in which the composition of the propellant blend is regulated to control the time required for reversal of phase are provided. The concentrate is the same in the four water-in-oil emulsions.

EXAMPLES 3A, B, C AND D

All Purpose Cleaner

| Constituent | Weight percent |
|---|---|
| Sodium heptadecyl sulfate [1] | 0.2 |
| Ethylene glycol monomethyl ether [2] | 0.4 |
| Mixed polyglycerol esters of refined oleic acid [3] | 0.6 |
| Ethyl alcohol (anhydrous) | 2.0 |
| Methyl polysiloxane [4] | 0.1 |
| Propellant blend (A, B or C) | 30.0 |
| Deionized water solution of 0.016 N NH₄OH | 66.7 |
| Total | 100.0 |

Propellant blend

| Ingredient | Boiling point ° C. atmos. pressure | Weight percent | | | |
|---|---|---|---|---|---|
| | | A | B | C | D |
| Cl₂F₂C (Freon 12) | −30 (−21.6° F.) | 13.2 | | | 7.7 |
| i-Butane | −12 (10.9° F.) | 7.9 | | 7.7 | |
| n-Butane | −2 (29° F.) | | 7.7 | | |
| Cl₃FC (Freon 11) | +24 (75.2° F.) | 8.9 | 22.3 | | |
| Cl₂F₂C₂ (Freon 113) | +48 (117.6° F.) | | | 22.3 | 22.3 |
| Total | | 30.0 | 30.0 | 30.0 | 30.0 |

[1] "Tergitol 7" from Union Carbide Chemical Company.
[2] "Methyl Cellosolve" from Union Carbide Chemical Company.
[3] "Emcol 14" from Witco Chemical Company.
[4] Dow Corning "200 Fluid" viscosity 500 centistokes, dimethylpolysiloxane commonly known as a silicone.

Three water-in-oil emulsions were prepared. Emulsion A was made using propellant "Blend A." Emulsion B was made using propellant "Blend B." Emulsion C was made using propellant "Blend C." To prepare emulsions A, B and C the ingredients were mixed in the following order: "Tergitol 7," "Methyl Cellosolve," ethanol, Freon 11 or 113, silicone, Emcol 14 and placed in an aerosol can or bottle and sealed with a valve assembly including a diptube. The balance of the propellant blend is injected into the container and the contents shaken to form a uniform oil phase. (When propellant is added without shaking an undesirable oil-in-water emulsion often results.) Ammonia water is added to the oil phase under pressure and the container shaken again to form a low viscosity water-in-oil emulsion.

Alternatively, the reversible water-in-oil emulsion can be made by mixing the water-soluble surfactant constituents with the propellant in a pressure vessel. The solution of the foam-forming constituents, e.g., "Tergitol 7," "Methyl Cellosolve," etc., in the propellant is injected into a hermetically sealed container, i.e., an aerosol container, in any suitable manner. Ammonia water is added under pressure and the container shaken to produce the water-in-oil emulsion. This is the preferred procedure. However, as an alternative, the ammonia water is introduced into an aerosol container, the container sealed, the propellant solution of the foam-forming constituents injected into the sealed can, and the contents shaken to produce the water-in-oil emulsion.

The water-in-oil emulsions A, B, C and D described hereinbefore differ solely in the composition of the propellant blend as is manifest from the following tabulations:

EMULSION "A"

| Propellant Blend | Percent of emulsion | Percent of propellant |
|---|---|---|
| Hydrocarbon | 7.9 | 26.3 |
| Freon | 22.1 | 73.7 |
| Total | 30.0 | 100.0 |

EMULSION "B"

| | | |
|---|---|---|
| Hydrocarbon | 7.7 | 25.7 |
| Freon | 22.3 | 74.3 |
| Total | 30.0 | 100.0 |

EMULSION "C"

| | | |
|---|---|---|
| Hydrocarbon | 7.7 | 25.7 |
| Freon | 22.3 | 74.3 |
| Total | 30.0 | 100.0 |

EMULSION "D"

| | | |
|---|---|---|
| Freon 12 | 7.7 | 25.7 |
| Freon 113 | 22.3 | 74.3 |
| Total | 30.0 | 100.0 |

The water-in-oil reversible emulsions were evaluated using a Precision Valve (0.040 inch 3 molded hole, 0.041 inch Buna N Gasket), 0.060 capillary dip-tube, and 0.030 inch regular top or button. Emulsion A reversed producing foam immediately upon discharge. Emulsion B was discharged as a water-in-oil emulsion which was reversed in the palm of the hand with agitation. The spray emulsion B reversed about six (6) to eight (8) inches from the dispenser or actuator. Emulsion C was reasonably stable and difficult to reverse in the palm of the hand. The spray of emulsion C reversed about fourteen (14) inches from the actuator. In other words, emulsion C persisted as a water-in-oil emulsion for about twice as long as did emulsion B. Both of emulsions B and C were reversed easily by the addition of water, or alcohol, or mineral spirits containing surfactant. Emulsion B which exists as a water-in-oil emulsion for a finite period of time, usually about 15 to about 30 seconds, was found easier to apply and more effective in removing soil from a painted surface than emulsion A which is an oil-in-water emulsion immediately upon discharge from the dispenser. That is to say the life of the water-in-oil emulsion A is only instantaneous after discharge from the container. Emulsions C and D can take a ½ hour or longer to reverse depending upon the ambient temperature. No specific time for reversal can be designated for the various emulsions since this will depend upon the propellant blend and ambient temperature. The degree of evaporation of the propellant blend determines the time of reversal. Incorporation of propellants with high boiling points delays the time of reversal. Similarly, the use of low boiling propellants will hasten the time of reversal.

The present invention provides water-in-oil aerosol emulsions which reverse to stable foamable oil-in-water emulsions on discharge or a predetermined period of time after discharge from the aerosol containers. When in the aerosol container, the oil phase coats the inside surface of the aerosol container thereby preventing corrosion which would ordinarily occur if water was the outer phase. More importantly, the oil emulsion of the invention is valuable as a cleaner. In order to remove oily deposits, stains, finger prints, and the like from surfaces, oil solvents are needed. However, these solvents leave an oily film and attract dust and dirt resulting in rapid resoiling. The present invention provides a stable water-in-oil emulsion adapted to delay reversal to an oil-in-water emulsion for a predetermined time. By delaying the reversal, the oils which are the continuous or outer phase of the emulsion can act as solvents for oil deposits and stains, thereby removing them from surfaces. As the oils, in particular the propellant, and other oil type ingredients dissolved in the propellant phase are worked, the propellant evaporates and reversal occurs as the water-soluble surfactant containing constituents leave the propellant phase and enter the water phase. These surfactant constituents cause the water phase to become the outer phase and any oils present are dispersed therein forming an oil-in-water emulsion which can foam and can readily be removed from the surface by either wiping or rinsing, leaving no oily film or residue.

What is claimed is:

1. A package consisting essentially of a hermetically sealed, valved, container having a pressure therein in the range of about 15 to about 75 pounds per square inch gauge at 70° F. and having therein a gaseous propellant phase and a stable, reversible, water-in-oil emulsion, said emulsion consisting essentially of dispersed water phase, continuous liquefied propellant phase, water-soluble surfactant containing constituent dissolved in said continuous phase, and at least one water-in-oil emulsifier which is dissolved in said continuous phase, said water-in-oil emulsion containing by weight 35% to 80% water, 10 to 50% liquefied propellant, 0.1% to 20% of water-soluble surfactant containing constituent, and a minor but effective amount of water-in-oil emulsifier, said water-in-oil emulsion reversing to a foamable oil-in-water emulsion at a predeterminable time after passing through the valve of the container.

2. A package as defined in claim 1 wherein said continuous liquefied propellant phase consists essentially of propellants having a boiling point less than about 70° F. and propellants having a boiling point greater than about 70° F. and said water-in-oil emulsion reversing to an oil-in-water emulsion a finite time after passing through said valve.

3. A package as defined in claim 1 wherein said continuous liquefied propellant phase consists essentially of propellants having boiling points less than about 70° F. and said water-in-oil emulsion reversing to an oil-in-water emulsion immediately upon passing through said valve.

4. A package as defined in claim 1 wherein said emulsifier is selected from the group consisting of fatty acid esters of anhydrosorbitol, polyglycerides of fatty acids and mixtures thereof.

5. A package as defined in claim 1 wherein said water-soluble surfactant is sodium heptadecyl sulfate, said water-in-oil emulsifier is mixed polyglycerol esters of refined oleic acid, and said liquefied propellant is selected from the group consisting of dichlorodifluoromethane, trichlorofluoromethane, trichlorotrifluoroethane, isobutane, butane, and mixtures thereof; said water-soluble surfactant containing constituent is 0.4 to 5%, said emulsifier is about .5 to about 3%, said propellant is 15 to 35%, and water is 50 to 75% by weight of final composition.

6. The method of preparing the emulsion of claim 1 which comprises the steps of:
  (a) dissolving or dispersing water-soluble surfactant containing constituent and water-in-oil emulsifier in said propellant phase in an aerosol container under pressure,
  (b) adding water phase under pressure, and
  (c) shaking the container for a short period of time thereby forming a water-in-oil emulsion in the container;

said water-in-oil emulsion being foamable and capable of phase reversal upon a predetermined time after discharge from the aerosol container.

7. A package consisting essentially of a hermetically sealed, valved, container having a pressure therein in the range of about 15 to about 75 pounds per square inch gauge at 70° F. and having therein a gaseous propellant phase and a stable, reversible, water-in-oil emulsion, said emulsion consisting essentially of dispersed water phase, continuous liquefied propellant phase and water-soluble surfactant selected from the group consisting of lauric and myristic diethanolamides, cetyl pyridinium chloride, mono-, di-, and triethanolamines, sodium heptadecyl sulfate, sodium dioleyl sulfosuccinate, cocomonoethanolamide, polyoxyethylene sorbitan monostearate, polyoxyethylene sorbitan monooleate and polyoxyethylene sorbitan trioleate dissolved in said continuous phase and at least one water-in-oil emulsifier selected from the group consisting of sorbitan monolaurate, sorbitan tristearate, sorbitan trioleate, polyglycerol monostearate, propylene glycol monostearate and diethylene glycol monooleate, which is dissolved in said continuous phase; said water-in-oil emulsion containing by weight 35 to 80% water, 10 to 50% liquefied propellant, 0.1 to 20% of water-soluble surfactant and about 0.5 to about 3% of water-in-oil emulsifier; said water-in-oil emulsion reversing to a foamable oil-in-water emulsion at a predeterminable time after passing through the valve of the container.

References Cited
UNITED STATES PATENTS

| | | | |
|---|---|---|---|
| 2,524,590 | 10/1956 | Boe | 252—305 |
| 2,995,278 | 8/1961 | Clapp | 222—146 |
| 2,995,521 | 8/1961 | Bluard | 252—90 |
| 3,505,236 | 4/1970 | Anstett | 252—90 |
| 3,541,581 | 11/1970 | Monson | 252—90 |

LEON D. ROSDOL, Primary Examiner
W. E. SCHULZ, Assistant Examiner

U.S. Cl. X.R.
252—307; 424—73